United States Patent
Takayama

(10) Patent No.: US 8,141,423 B2
(45) Date of Patent: Mar. 27, 2012

(54) ELECTRONIC DEVICE INCLUDING TWO ELECTRONIC COMPONENTS CONNECTED WITH EACH OTHER AND OUTPUT TERMINAL AND METHOD OF MANUFACTURING SAME

(75) Inventor: Tomoya Takayama, Kariya (JP)

(73) Assignee: Denso Corporation, Kariya (JP)

( * ) Notice: Subject to any disclaimer, the term of this patent is extended or adjusted under 35 U.S.C. 154(b) by 590 days.

(21) Appl. No.: 12/315,240

(22) Filed: Dec. 1, 2008

(65) Prior Publication Data

US 2009/0145222 A1    Jun. 11, 2009

(30) Foreign Application Priority Data

Dec. 6, 2007   (JP) ................. 2007-316089

(51) Int. Cl.
  *G01P 1/02* (2006.01)
  *G01P 3/42* (2006.01)
(52) U.S. Cl. ............... 73/488; 73/493; 324/207.25
(58) Field of Classification Search ......... 73/488, 73/493, 494; 324/173, 174, 207.21, 207.25
   See application file for complete search history.

(56) References Cited

U.S. PATENT DOCUMENTS

| | | | | |
|---|---|---|---|---|
| 4,896,007 | A | * | 1/1990 | Yamazaki ............ 200/61.87 |
| 5,154,632 | A | * | 10/1992 | Ijiri ........................ 439/394 |
| 6,873,232 | B2 | * | 3/2005 | Chida et al. ............. 335/78 |
| 7,000,470 | B2 | * | 2/2006 | Iijima et al. ............. 73/493 |
| 7,337,679 | B2 | * | 3/2008 | Hattori et al. ......... 73/862.08 |
| 2005/0126308 | A1 | | 6/2005 | Tsuge et al. |

FOREIGN PATENT DOCUMENTS

| | | |
|---|---|---|
| JP | 2-42445 | 3/1990 |
| JP | 7-38048 | 2/1995 |
| JP | 07-245377 | 9/1995 |
| JP | 2002-151641 | 5/2002 |
| JP | 2002-257587 | 9/2002 |
| JP | 2005-172573 | 6/2005 |

OTHER PUBLICATIONS

English translation of Japanese reference JP 2002-151641.*
Office action dated Nov. 2, 2009 in corresponding Japanese Application No. 2007-316089.

* cited by examiner

*Primary Examiner* — Helen C. Kwok
(74) *Attorney, Agent, or Firm* — Harness, Dickey & Pierce, PLC

(57) ABSTRACT

An electronic device includes a first electronic component having a terminal member and a second electronic component connected with the first electronic component. The terminal member includes a trunk portion, an external terminal portion that extends in a straight direction from the trunk portion to be connected with a lead wire at its connection end and a U-shaped internal terminal portion that has one side extending from the trunk portion and the other side extending in a direction opposite to the straight direction and connected with the second electronic component at its connection end.

8 Claims, 6 Drawing Sheets

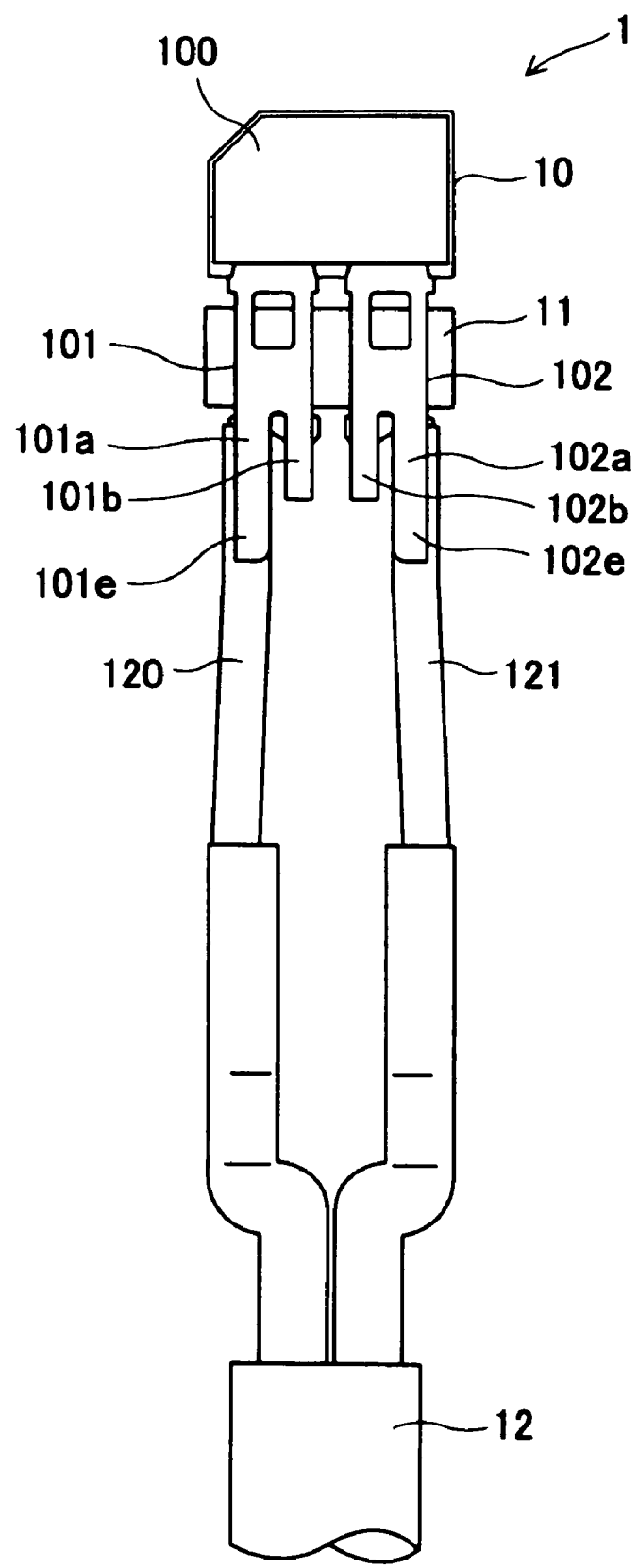

ELECTRONIC DEVICE INCLUDING TWO ELECTRONIC COMPONENTS CONNECTED WITH EACH OTHER AND OUTPUT TERMINAL AND METHOD OF MANUFACTURING SAME

CROSS REFERENCE TO RELATED APPLICATION

The present application is based on and claims priority from Japanese Patent Application 2007-316089, filed Dec. 6, 2007, the contents of which are incorporated herein by reference.

BACKGROUND OF THE INVENTION

1. Field of the Invention

The present invention relates to an electronic device that includes two electronic components connected with each other, a housing and an output terminal outwardly extending from the housing to be connected with a lead wire.

2. Description of the Related Art

JP-A-2005-172573 discloses a vehicle-wheel speed sensor such as an electronic device.

As shown in FIG. 6, a vehicle-wheel speed sensor 2 includes a rotation detecting circuit that is formed on an IC chip (hereinafter referred to as the rotation detecting IC) 20 and a cup-shaped housing 22. The rotation detecting IC 20 includes a pair of terminals 200, 201, which is connected to a lead wire 21 The rotation sensing IC 20 is disposed inside the housing 22 and covered with resinous material that fills the space between the IC 20 and the housing 22.

As shown in FIG. 7, another vehicle-wheel speed sensor 3 includes a capacitor in addition to a rotation detecting IC 30 and a pair of terminals 300, 301. In this case, it is necessary to have a space between the rotation detecting IC 30 and the capacitor because of manufacturing problems. Therefore, the length of the vehicle-wheel sensor shown in FIG. 7 becomes longer than the vehicle-wheel sensor shown in FIG. 6.

Accordingly, it is difficult to manufacture the above two types of the speed sensors by a same manufacturing facility or line.

SUMMARY OF THE INVENTION

Therefore, an object of the invention is to provide an improved electronic device in which a plurality of electronic components can be accommodated without increasing the size of the housing thereof.

Another object of the invention is to provide electronic devices that can be manufactured by a same manufacturing facility of line.

According to a feature of the present invention, an electronic device includes a first electronic component having a terminal member and a second electronic component connected with the first electronic component. In this electronic device, the terminal member includes a terminal having a trunk portion, an external terminal portion that extends in a straight direction from the trunk portion to be connected with a lead wire at its connection end and a U-shaped internal terminal portion that has one side extending from the trunk portion and the other side extending in a direction opposite to the straight direction and connected with the second electronic component at its connection end.

In the above electronic device: the terminal member may include a pair of the terminals; the terminal member may be made of an elongated conductive plate; the first electronic component may include an integrated circuit; and the second electronic component may include a capacitor.

A further object of the invention is to provide a method of manufacturing the above electronic device.

According to another feature of the invention, a method of manufacturing the above described electronic device includes the following steps: providing the terminal member with a trunk portion, an external terminal portion extending straight from the trunk portion to form an external connection end and an internal terminal portions extending along the external terminal portion across an L-shaped groove to form an internal connection end; connecting the first electronic component with the trunk portion of the terminal member; connecting the second electronic component with the internal connection end of the internal terminal member; folding the internal terminal member so that the second electronic component can be located near the first electronic component and so that the external terminal member can project from the internal terminal member.

In this method, the step of providing the terminal member may include cutting the L-shaped groove from an elongated conductive plate to form the trunk portion at an end of the conductive plate, the external terminal portion at one side of the L-shaped groove and the internal terminal portions at the other side of the L-shaped groove.

Therefore, an electronic device that includes two or more electronic components can be manufactured without any problem.

According to further feature of the invention, a method of manufacturing an electronic device that includes an integrated circuit having a pair of terminals and a capacitor connected with the integrated circuit includes the following steps: providing each of the terminals with a trunk portion, an external terminal portion extending straight from the trunk portion to form an external connection end and an internal terminal portion extending along the external terminal portion across an L-shaped groove to form an internal connection end; connecting the integrated circuit with the trunk portion of the terminals; connecting the capacitor across the internal connection ends of the internal terminal portions; folding the internal terminal portions so that the capacitor can be located near the integrated circuit and so that the external terminal portions can project from the internal terminal portions.

In the above method, the step of providing the terminals may include cutting an L-shaped groove from an elongated conductive plate to form the trunk portion at an end of the conductive plate, the external terminal portion at one side of the L-shaped groove and the internal terminal portions at the other side of the L-shaped groove.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 3 is a front view illustrating the wheel speed sensor that is connected with a lead wire;

DETAILED DESCRIPTION OF THE PREFERRED EMBODIMENTS

Two preferred embodiments according to the present invention will be described with reference to the appended drawings.

A wheel speed sensor 1 according to the first embodiment of the present invention will be described with reference to FIGS. 1-4.

Figure 1:
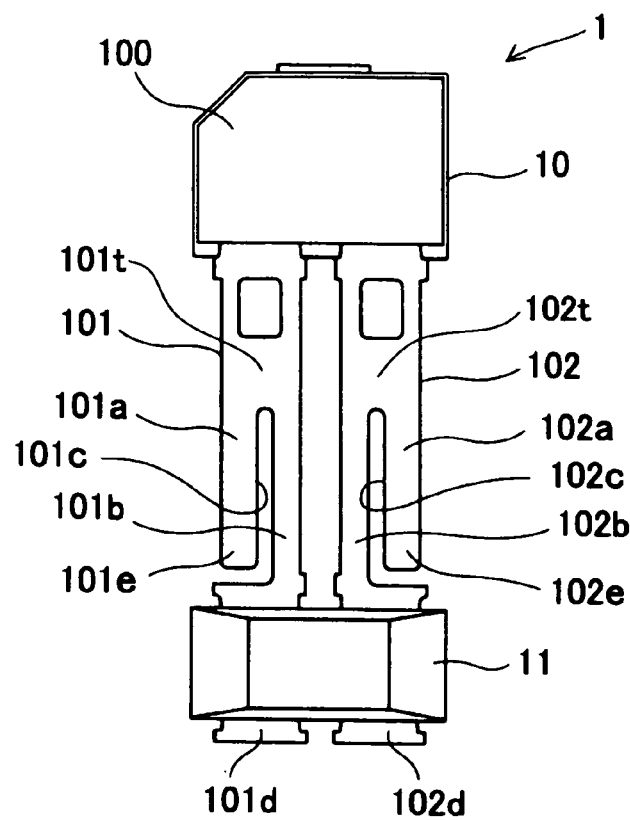
FIG. 1 is a front view illustrating a wheel speed sensor according to the first embodiment of the invention at a step before completion.

As shown in FIG. 1, the wheel speed sensor 1, as a electronic device, includes a rotation detecting IC 10 and a capacitor 11.

The rotation detecting IC 10 is used with a permanent magnet rotor (not shown) that is linked with vehicle wheels and provides an output signal when the permanent magnet rotor rotates together with the vehicle wheels. The rotation detecting IC 10 includes a body portion 100 and a pair of terminals 101, 102 made of an elongated conductive plate.

The terminals 101, 102 are made by cutting L-shaped grooves 101c, 102c from an elongated conductive plate. The terminals 101, 102 respectively have trunk portions 101t, 102t, external terminal portions 101a, 102a and internal terminal portions 101b, 102b, which branch off from the trunk portions 101t, 102t. The external terminal portions 101a, 102a have connection ends 101e, 102e and extend straight from the body portion 100. The internal terminal portions 101b, 102b have connection ends 101d, 102d and extend along the external terminal portions 101a, 102a across the L-shaped grooves 101c, 102c to be connected to the capacitor 11 at the connection ends 101d, 102d. The rotation detecting IC 10 is formed when the terminals 101, 102 are welded to the body portion 100 at the trunk portions 101t, 102t thereof.

Therefore, the space between the body portion 100 and the connection ends 101d, 102d is sufficient for the capacitor 11 to mount without any manufacturing problem. Because the internal terminal portions 101b, 103b extending along the L-shaped grooves are separated from the external terminal portions 101a, 102a, it can be folded.

Figure 2A:
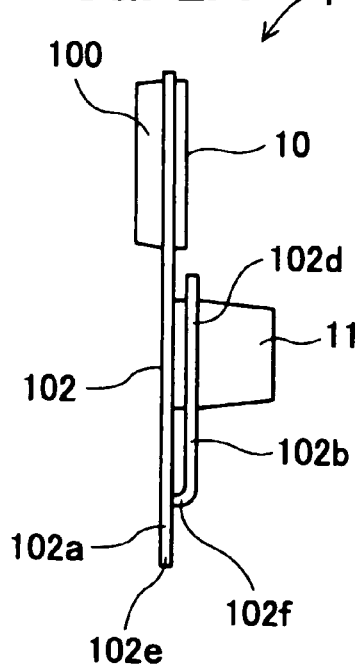
FIGS. 2A and 2B are respectively side view and front view illustrating the wheel speed sensor in a completed state.
Figure 2B:
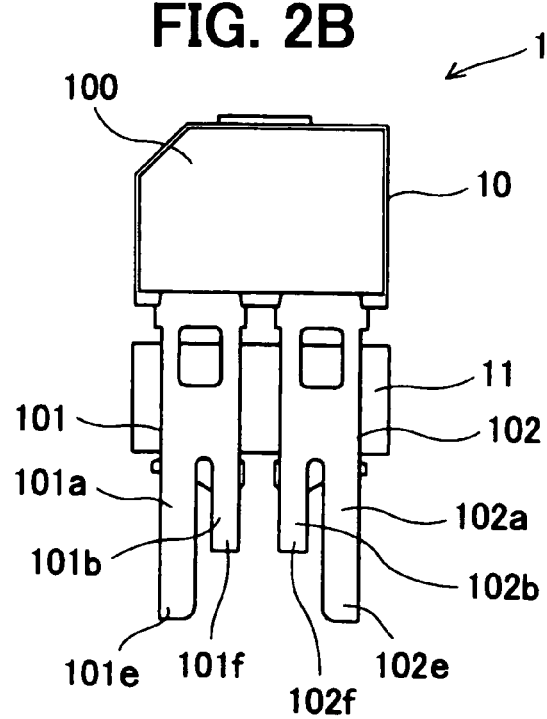

As shown in FIGS. 2A and 2B, the internal terminal portions 101b, 102b are folded into a U-shape so that the capacitor 11 can be located near the body portion 100 and so that the connection ends 101e, 102e of the external terminal portions 101a, 102a can project from turn portions 101f, 102f of the internal terminal portions 101b, 102b.

Figure 4:
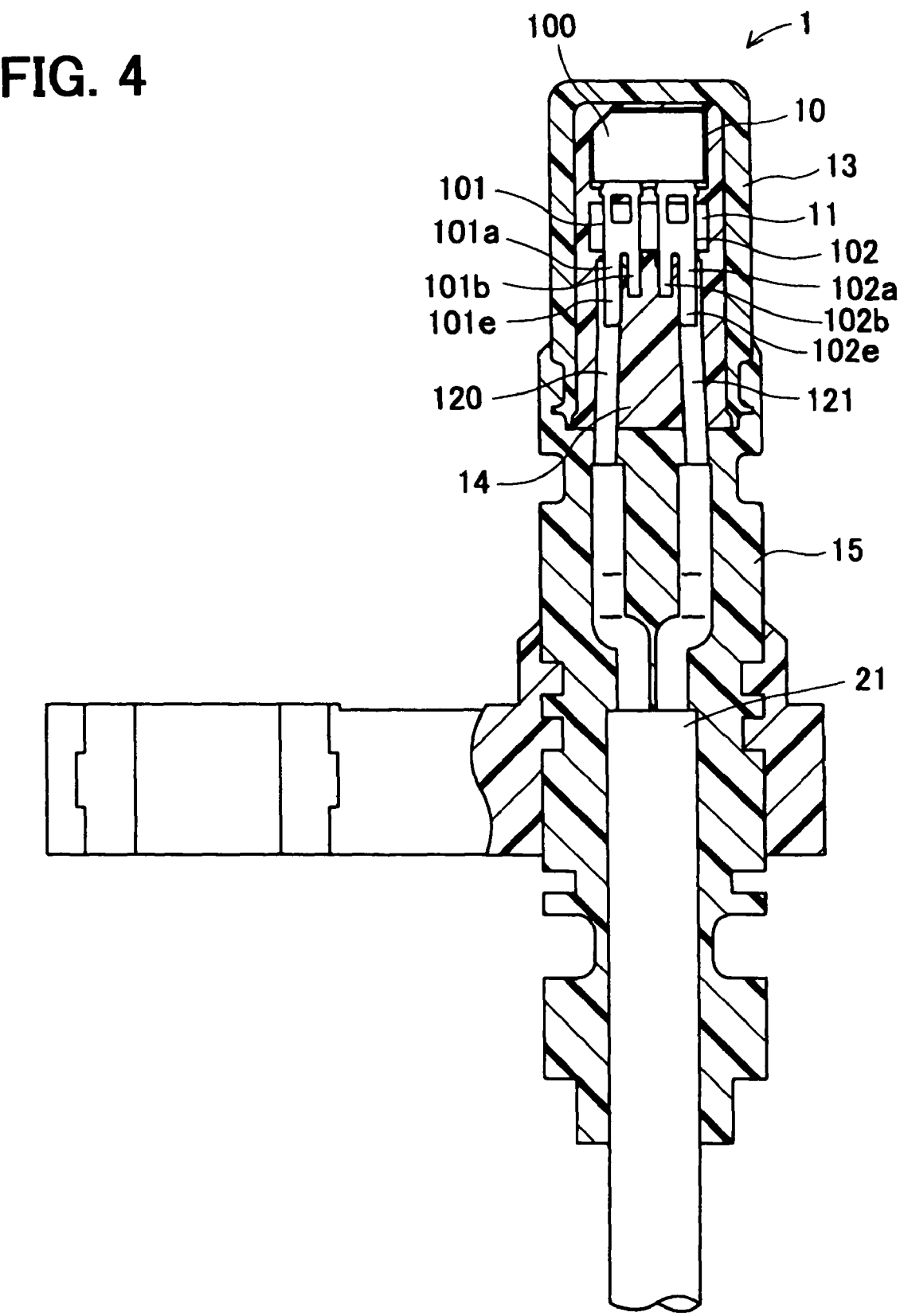
FIG. 4 is a cross-sectional front view illustrating the inside of the wheel speed sensor.

As shown in FIG. 3, the connection ends 101e, 102e of the external terminal portions 101a, 102a are respectively welded to wires 120, 121 of a lead wire 12. As shown in FIG. 4, the rotation detecting IC 10 and the capacitor 11 are housed in a cup-shaped housing 13. The inside of the housing 13 is filled with resinous material 14 to tightly fasten the rotation detecting IC 10 and the capacitor 11. The housing 13 and the lead wire 12 are also molded together by resinous material 15.

Therefore, the rotation detecting IC 10 and the capacitor 11 can be housed in the same housing 13 as that in which only rotation detecting IC 10 is housed.

Figure 5:
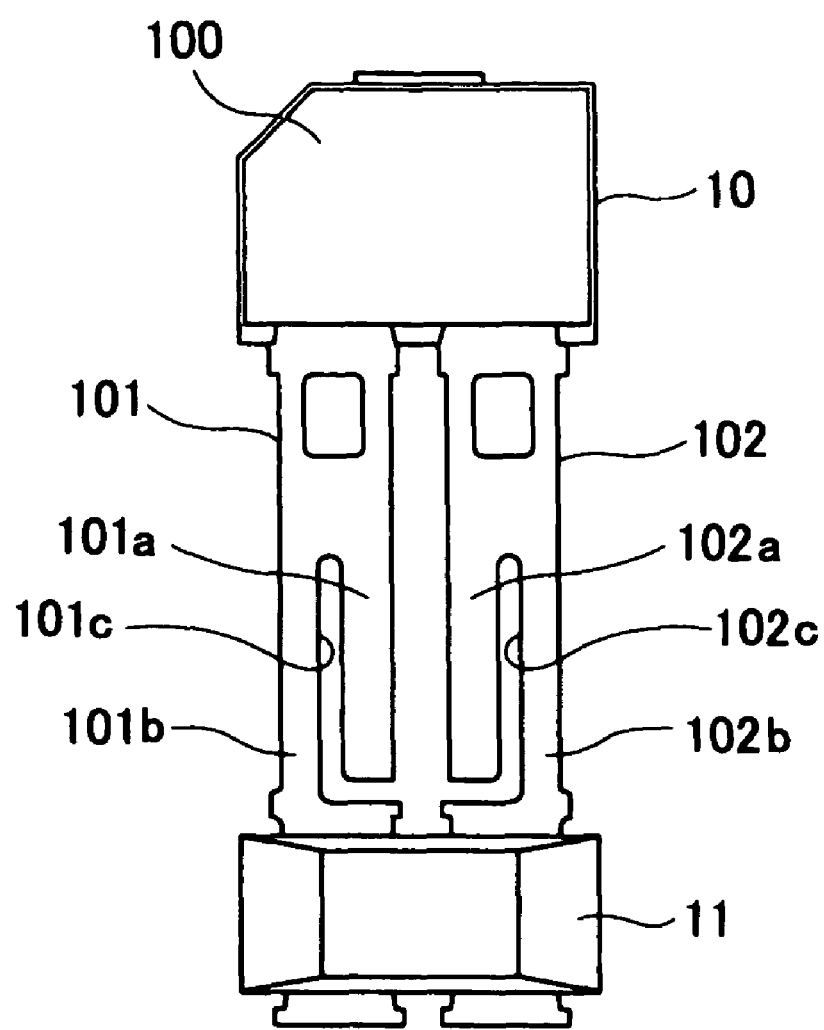
FIG. 5 is a front view illustrating a wheel speed sensor according to the second embodiment of the invention at a step before completion.
Figure 6:
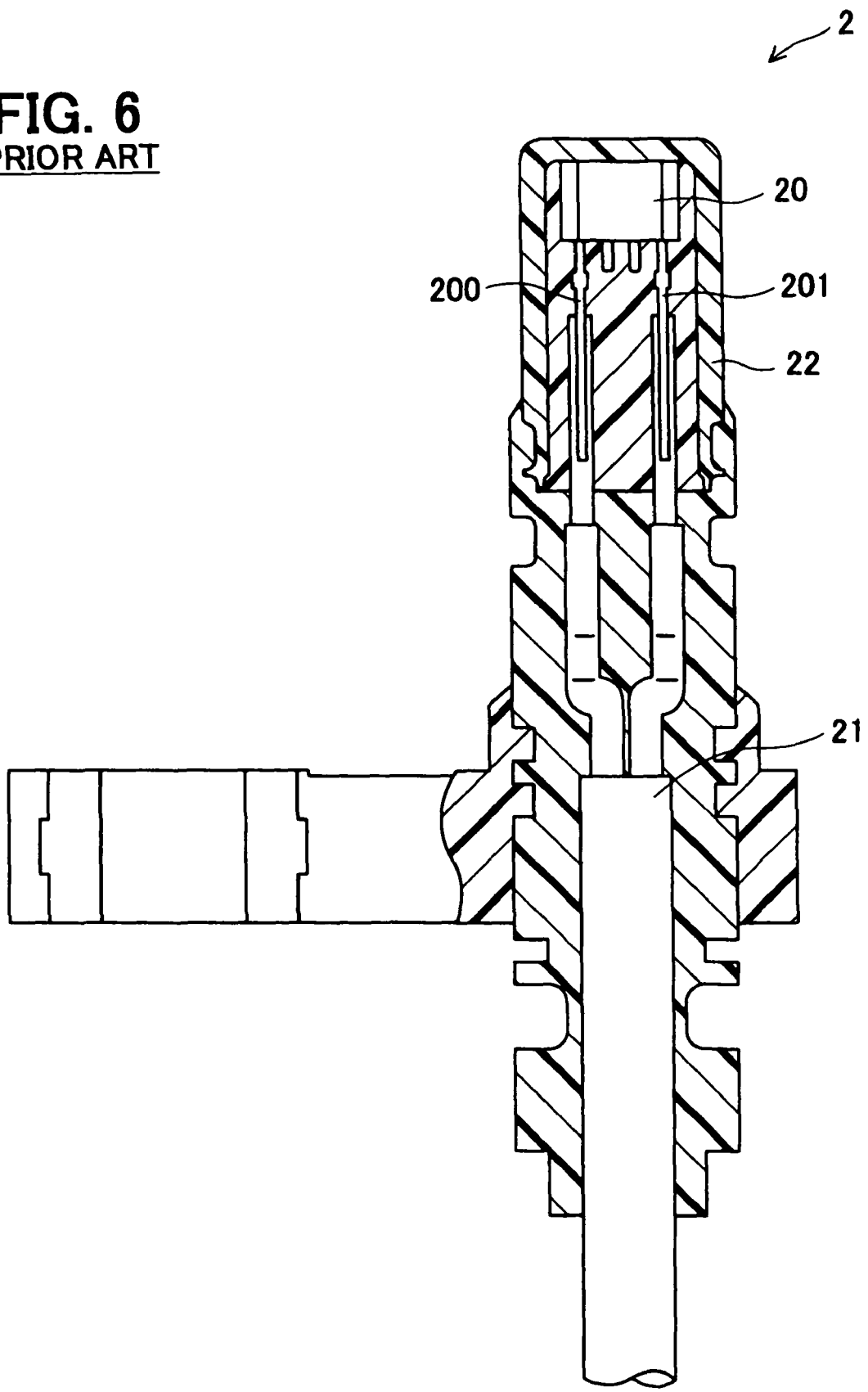
FIG. 6 is a cross-sectional front view illustrating the inside of a prior art wheel speed sensor that is connected with a lead wire.
Figure 7:
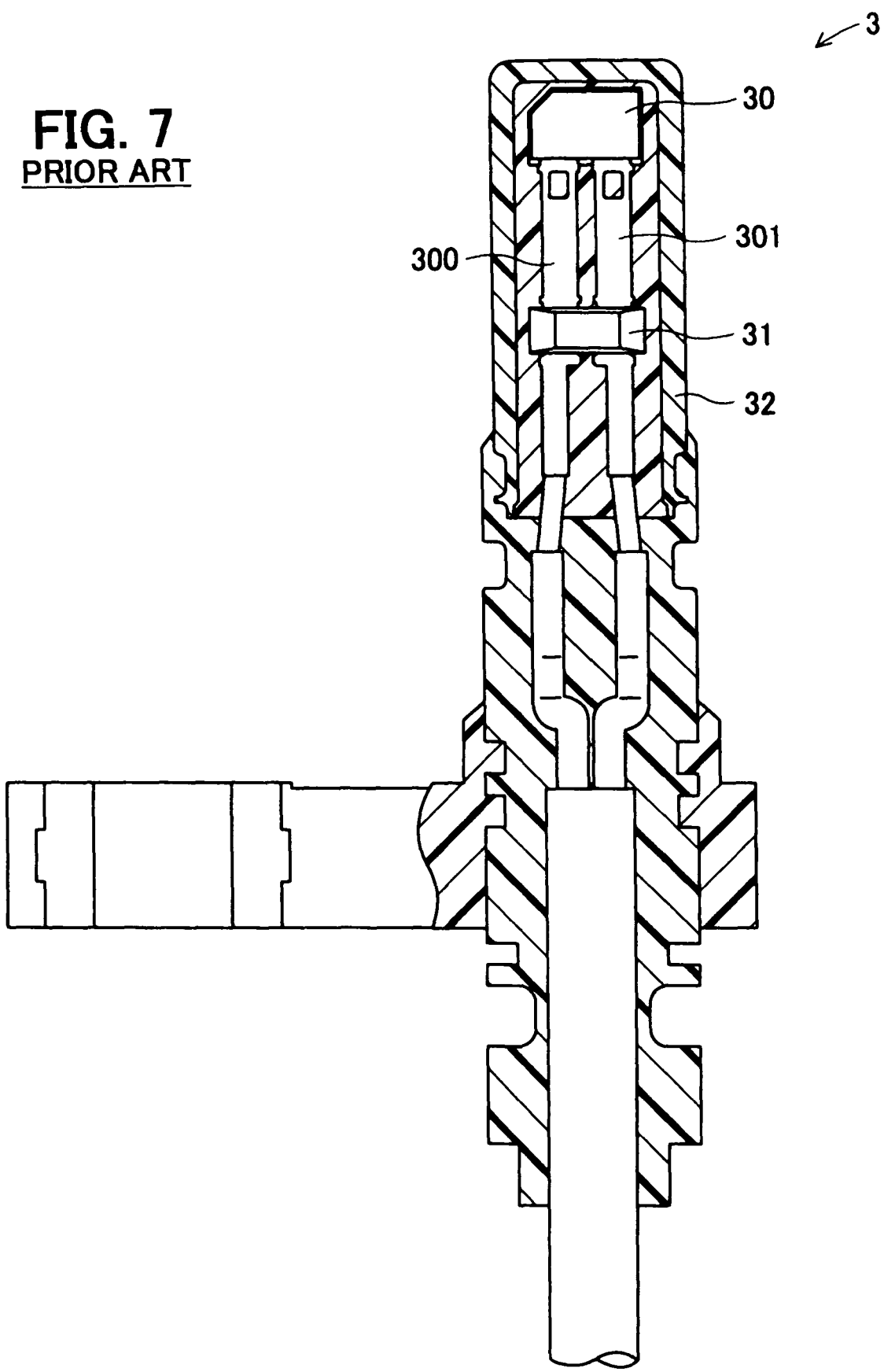
FIG. 7 is a cross-sectional front view illustrating the inside of another prior art wheel speed sensor that is connected with a lead wire

A wheel speed sensor 1 according to the second embodiment of the present invention will be described with reference to FIG. 5.

Incidentally, the same reference numeral represents the same or substantially the same portion, part or component as the first embodiment.

The terminals 101, 102 respectively have a trunk portion 101t, 102t, external terminal portions 101a, 102a and internal terminal portions 101b, 102b, which branch off from the trunk portions thereof so that the internal terminal portions 101b, 102b extend along inner sides of the external terminal portions 101a, 102a across L-shaped grooves 101c, 102c to be connected to the capacitor 11 at the connection ends.

The internal terminal portions 101b, 102b are folded into a U-shape in the same manner as the terminal portions of the first embodiment. The external terminal portions 101a, 102a are respectively welded to wires 120, 121 of a lead wire 12, and the rotation detecting IC 10 and the capacitor 11 are housed in a cup-shaped housing 13 and molded together in the same manner as the first embodiment.

Therefore, the rotation detecting IC 10 and the capacitor 11 can be housed in the same housing 13 as that in which only rotation detecting IC 10 is housed.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An electronic device comprising:
    a first electronic component including a body portion and a terminal extending from the body portion, the body portion including a rotation detecting IC; and
    a second electronic component including a capacitor, the second electronic component being connected to the terminal, wherein
    the terminal includes a trunk portion, a first terminal portion and a second terminal portion,
    the trunk portion extends from the body portion,
    the first terminal portion extends from the trunk portion in a direction opposite to the body portion and defines a connection end adapted to be connected to a wire, and
    the second terminal portion extends from the trunk portion in the direction opposite to the body portion and is folded toward the body portion into a U-shape such that an end of the second terminal portion opposite to the trunk portion is located adjacent the body portion and the second electronic component is connected to the end of the second terminal portion adjacent the body portion.

2. An electronic device as claimed in claim 1, wherein the first electronic component includes a plurality of terminals including the terminal, and the plurality of terminals extend in the same direction.

3. An electronic device as claimed in claim 1, wherein the terminal is made of an elongated conductive plate.

4. The electronic device as claimed in claim 1, wherein the connection end of the first terminal portion is located further from the body portion than a bent portion of the second terminal portion.

5. The electronic device as claimed in claim 1, wherein the rotation detecting IC detects rotation of a wheel.

6. The electronic device as claimed in claim 1, wherein the first terminal portion is an external terminal portion and the second terminal portion is an internal terminal portion.

7. The electronic device as claimed in claim 1, wherein the first terminal portion is an internal terminal portion and the second terminal portion is an external terminal portion.

8. The electronic device as claimed in claim 1, wherein the second terminal portion includes a first section parallel to the first terminal portion, a U-shaped section attached to the first section and a second section parallel to the first terminal portion attached to the U-shaped section.

* * * * *